United States Patent [19]
Bollaert et al.

[11] Patent Number: 5,505,489
[45] Date of Patent: Apr. 9, 1996

[54] INFLATABLE OCCUPANT RESTRAINT

[75] Inventors: Matthew C. Bollaert, Capac; Steven W. Maurer, Clinton Township; Jeffrey C. Synor, Utica, all of Mich.

[73] Assignee: TRW Vehicle Safety Systems Inc., Lyndhurst, Ohio

[21] Appl. No.: 260,097

[22] Filed: Jun. 15, 1994

[51] Int. Cl.⁶ .................................................. B60R 21/22
[52] U.S. Cl. ................................. 280/743.1; 280/728.3; 280/730.2
[58] Field of Search ...................... 280/728 R, 743 R, 280/730 R, 730 A, 728 A

[56]  References Cited

U.S. PATENT DOCUMENTS

| | | | |
|---|---|---|---|
| 3,810,654 | 5/1974 | DeBano et al. | 280/728 R |
| 4,006,918 | 2/1977 | MacFarland. | |
| 4,169,613 | 10/1979 | Barnett. | |
| 5,074,585 | 12/1991 | Satoh. | |
| 5,342,081 | 8/1994 | Rogerson | 280/728.2 |

FOREIGN PATENT DOCUMENTS

| | | | |
|---|---|---|---|
| 4-100753 | 4/1992 | Japan | 280/743 R |
| 2262918 | 7/1993 | United Kingdom | 280/728 A |

*Primary Examiner*—Eric D. Culbreth
*Attorney, Agent, or Firm*—Tarolli, Sundheim, Covell, Tummino & Szabo

[57]  ABSTRACT

An air bag (10) for use with an inflation fluid source (34) includes a body portion (170) defining an inflation fluid volume (172) into which inflation fluid is directed to inflate the body portion. A mouth portion (160) of the air bag (10) is connected with the body portion (170). The mouth portion (160) defines an inflation fluid opening (176) in fluid communication with the inflation fluid volume (172). The inflation fluid opening (176) is defined in part by opposite fabric material panels (40, 42). Each panel (40, 42) comprises at least two layers (130, 132, 140, 142) of fabric material in abutting engagement with each other. At least two layers (130, 132, 140, 142) of fabric material encircle a retaining ring (174) for attaching the air bag mouth portion (160) to the inflation fluid source (34).

6 Claims, 4 Drawing Sheets

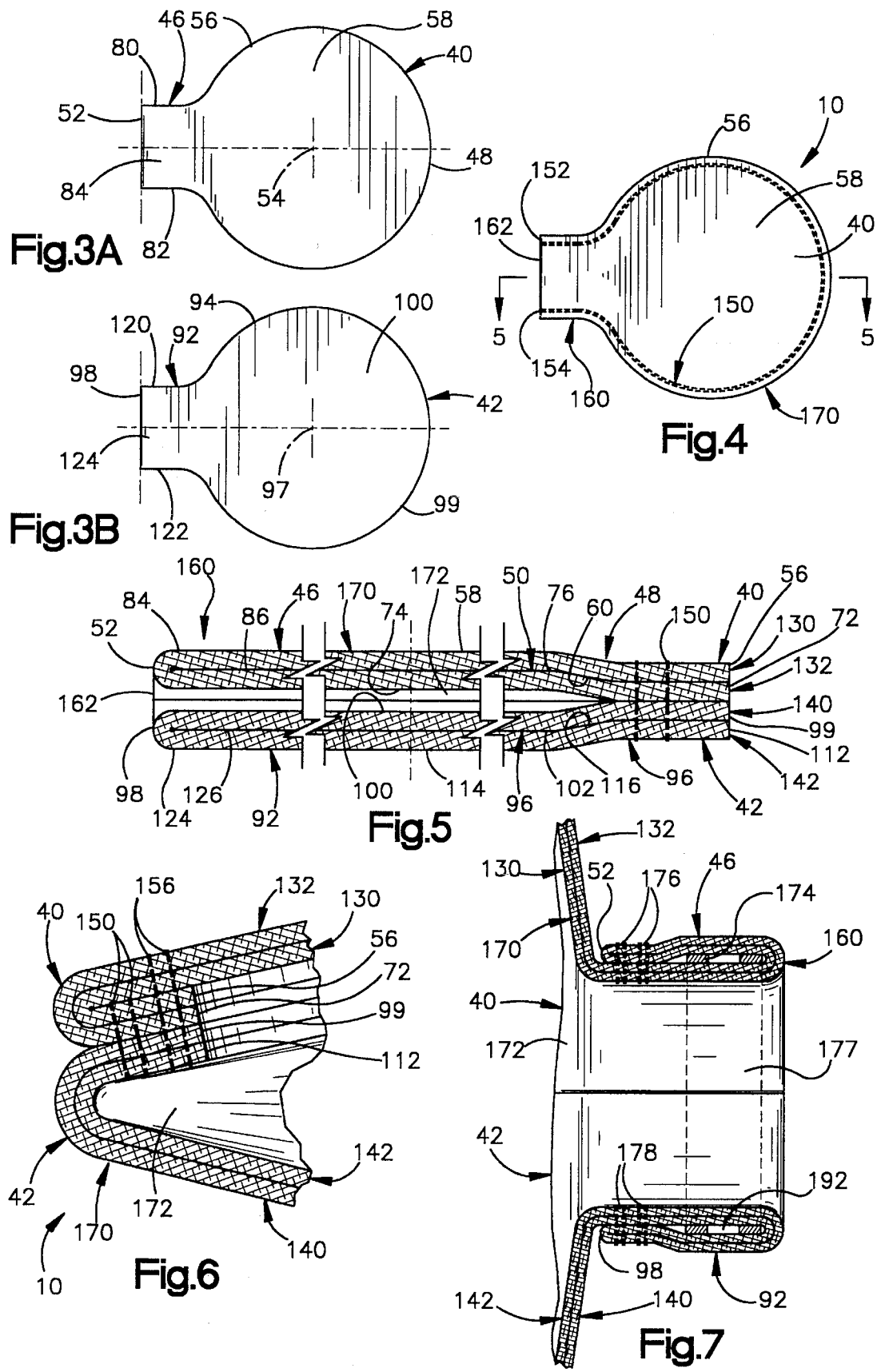

5,505,489

INFLATABLE OCCUPANT RESTRAINT

BACKGROUND OF THE INVENTION

1. Technical Field

The present invention relates to an inflatable restraint, and particularly relates to an inflatable vehicle occupant restraint including a plurality of layers of fabric material.

2. Description of the Prior Art

It is known to inflate an air bag to restrain a vehicle occupant in the event of a vehicle collision requiring vehicle occupant restraint. A typical air bag is made from one or more panels of fabric material. The panels are sewn to form an inflation fluid volume into which inflation fluid is directed through an inflation fluid opening. The air bag is folded and stored along with a source of inflation fluid in a vehicle. In the event of a vehicle collision requiring vehicle occupant restraint, the inflation fluid source is actuated to direct inflation fluid under pressure through the inflation fluid opening and into the inflation fluid volume. Thus, the air bag inflates to restrain the vehicle occupant.

It is important that an air bag be capable of withstanding the pressure of the inflation fluid. This can be especially important in side impact air bags which are relatively small in overall volume and attain relatively high internal pressures.

SUMMARY OF THE INVENTION

The present invention is an inflatable vehicle occupant restraint for use in association with an inflation fluid source. The inflatable restraint comprises a body portion defining an inflation fluid volume into which inflation fluid is directed to inflate the body portion, and a mouth portion connected with the body portion. The mouth portion defines an inflation fluid opening which is in fluid communication with the inflation fluid volume and through which inflation fluid is directed into the inflation fluid volume to inflate the body portion. The mouth portion includes means for attaching the mouth portion to the inflation fluid source. The mouth portion comprises at least two layers of fabric material overlying each other in abutting engagement and encircling the means for attaching the mouth portion to the inflation fluid source.

BRIEF DESCRIPTION OF THE DRAWINGS

The foregoing and other features of the present invention will become apparent to those skilled in the art to which the present invention relates from reading the following description with reference to the accompanying drawings, in which:

FIG. 3A is a view similar to FIG. 2A showing the fabric panel of FIG. 2A folded;

FIG. 3B is a view similar to FIG. 3A showing the panel of FIG. 2B folded;

FIG. 4 is a view showing the fabric panels of FIGS. 3A and 3B in abutting engagement and sewn together;

FIG. 5 is a sectional view taken along line 5—5 of FIG. 4;

FIG. 6 is an enlarged fragmentary sectional view of a seam portion of the inflatable restraint of FIG. 1;

FIG. 7 is an enlarged fragmentary sectional view of a mouth portion of the inflatable restraint of FIG. 1 and showing an associated retaining ring;

DESCRIPTION OF PREFERRED EMBODIMENTS OF THE INVENTION

Figure 1:
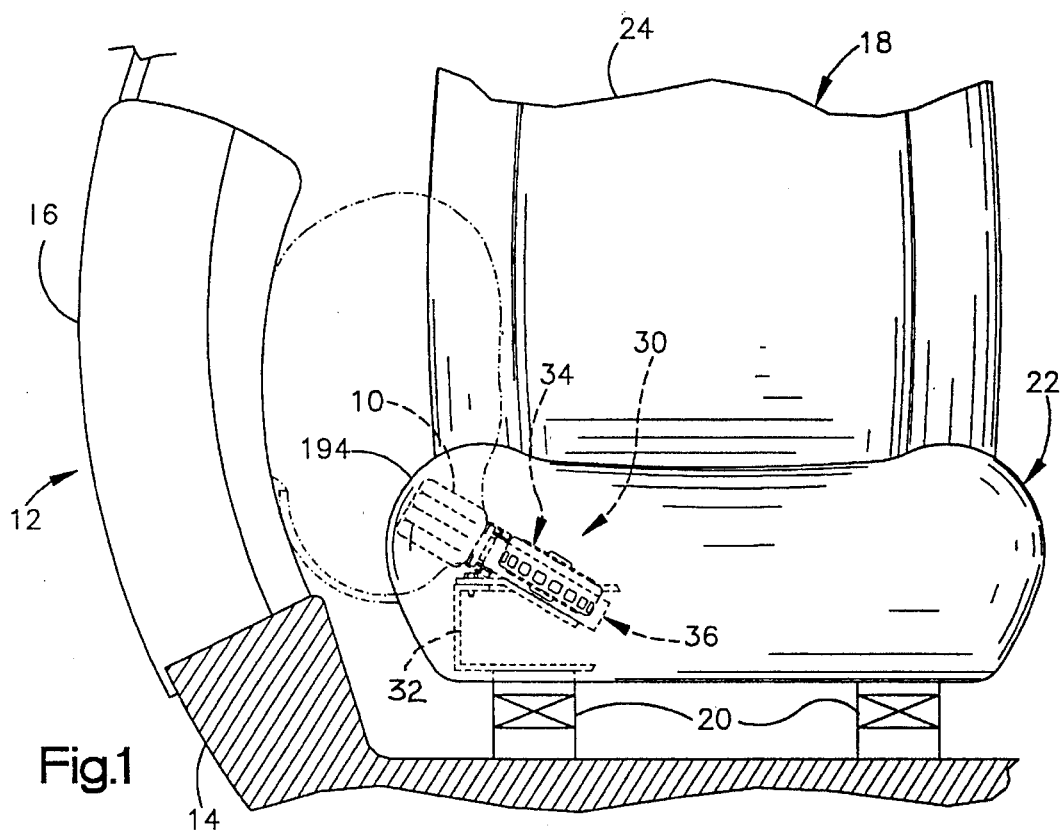
FIG. 1 is a schematic view of a portion of a vehicle including an inflatable occupant restraint constructed in accordance with a first embodiment of the invention.

The present invention relates to an inflatable restraint and particularly to an inflatable vehicle occupant restraint, such as an air bag. The present invention is applicable to various inflatable restraint constructions. As representative of the present invention, FIG. 1 illustrates an air bag 10.

The air bag 10 is disposed in a vehicle 12. The vehicle 12 has a body 14 including a door 16. Disposed adjacent to the door 16 is a seat 18 supported on the vehicle body 14 by tracks 20. The seat 18 includes a seat bottom cushion 22 and a seat back 24.

A side impact air bag module 30 is mounted on a frame member 32 of the seat bottom cushion 22. The air bag module 30 includes an inflator 34 secured in a manifold 36. The module 30 also includes the air bag 10. The air bag 10 is secured to the manifold 36, and is inflatable to restrain an occupant of the seat 18, in a manner as will be described below.

Figure 2A:
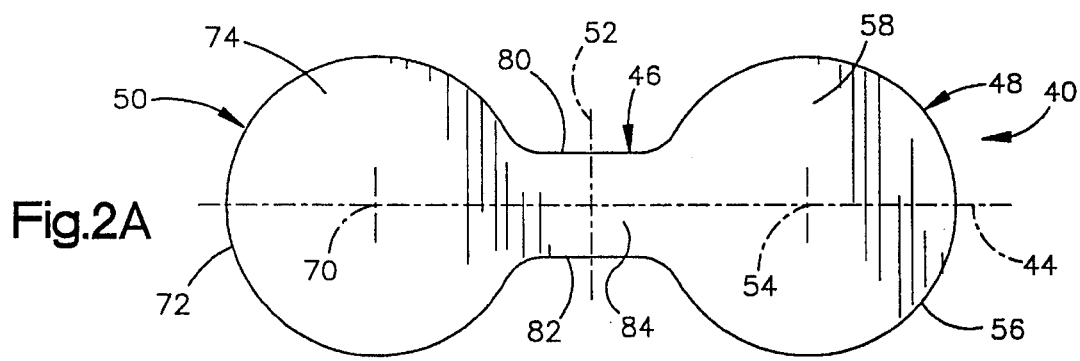
FIG. 2A is a top plan view showing in an unfolded condition one of two separate fabric panels from which the inflatable restraint of FIG. 1 is made.

The air bag 10 is formed from two separate fabric material panels 40 and 42 (FIGS. 2A and 2B) which are folded and sewn together in a manner as illustrated sequentially in FIGS. 2A–7. The panel 40, shown unfolded in FIG. 2A, is a single piece of fabric material having a longitudinal central axis 44. A neck portion 46 of the panel 40 is disposed intermediate two identical body portions 48 and 50. The panel 40 is symmetrical about the axis 44 and also about a fold line 52 which extends through the longitudinal center of the neck portion 46 in a direction perpendicular to the axis 44.

The first body portion 48 of the panel 40 is generally circular in configuration with a center 54 disposed on the axis 44. The first body portion 48 has a circular outer peripheral edge 56, an upper major side surface 58 and a lower major side surface 60 (visible in FIG. 5).

The second body portion 50 of the panel 40 (FIG. 2A) is generally circular in configuration with a center 70 disposed on the axis 44. The second body portion 50 has a circular outer peripheral edge 72, an upper major side surface 74, and a lower major side surface 76 (FIG. 5).

Spaced apart parallel edges 80 and 82 (FIG. 2A) of the neck portion 46 of the panel 40 extend axially between the peripheral edges 56 and 72 of the body portions 48 and 50. An upper major side surface 84 of the neck portion 46 extends between the upper major side surfaces 58 and 74 of the body portions 48 and 50. A lower major side surface 86 (FIG. 5) of the neck portion 46 extends between the lower major side surfaces 60 and 76 of the body portions 48 and 50.

Figure 2B:
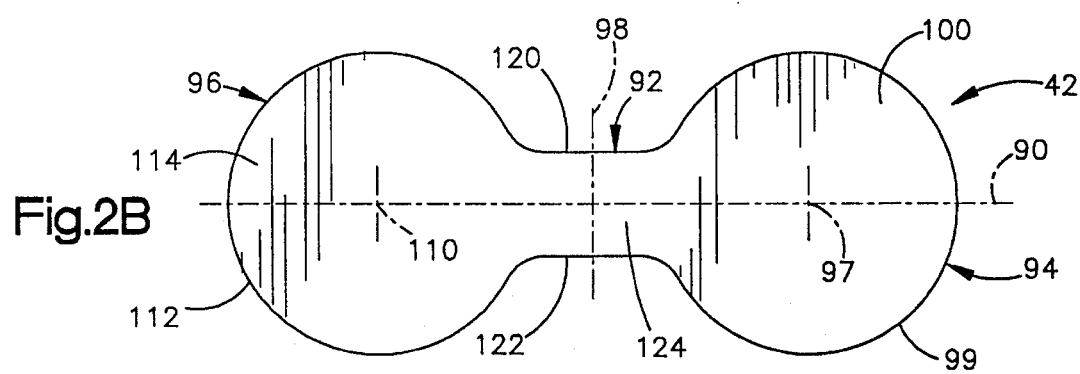
FIG. 2B is a view similar to FIG. 2A showing another panel from which the inflatable restraint of FIG. 1 is made.

The air bag panel 42, shown unfolded in FIG. 2B, is identical in construction to the panel 40. The panel 42 is a single piece of fabric material having a longitudinal central axis 90. A neck portion 92 of the panel 42 is disposed intermediate two identical body portions 94 and 96. The panel 42 is symmetrical about the axis 90 and also about a fold line 98 which extends through the longitudinal center of the neck portion 92 in a direction perpendicular to the axis 90.

The first body portion 94 of the panel 42 is generally circular in configuration having a center 97 disposed on the axis 90 and a circular outer peripheral edge 99. The body portion 94 has an upper major side surface 100 (FIG. 2B) and a lower major side surface 102 (FIG. 5).

The second body portion 96 of the panel 42 (FIG. 2B) is generally circular in configuration having a center 110 disposed on the axis 90 and a circular outer peripheral edge 112. The second body portion 96 of the panel 42 has an upper major side surface 114 and a lower major side surface 116 (FIG. 5).

The neck portion 92 (FIG. 2B) of the panel 42 has spaced apart parallel edges 120 and 122 which extend axially between the outer peripheral edges 99 and 112 of the body portions 94 and 96. An upper major side surface 124 of the neck portion 92 extends between the upper major side surfaces 100 and 114 of the body portions 94 and 96. A lower major side surface 126 (FIG. 5) of the panel 42 extends between the lower major side surfaces 102 and 116 of the body portions 94 and 96.

The air bag 10 is assembled by first folding each of the panels 40 and 42 (FIGS. 2A, 2B, 3A, and 3B) on its respective fold line from the condition shown in FIGS. 2A and 2B to the condition shown in FIGS. 3A and 3B. The folded condition of the panels 40 and 42 is also illustrated in FIG. 5 which shows the panels as folded and after having been sewn together in a manner as will be described below.

Specifically, the panel 40 (FIGS. 2A and 3A) is folded on the panel fold line 52 to form two layers 130 and 132 of fabric material which overlie each other and are in abutting engagement as best seen in FIG. 5. In this folding step, the panel 40 is folded so that the body portion 50 pivots about the fold line 52 in a direction down into the paper as seen in FIG. 2A then moves upward into a position underneath the body portion 48. The lower major side surface 60 of the first body portion 48 is in abutting engagement with the lower major side surface 76 of the second body portion 50. The upper major side surface 58 of the first body portion 48 is spaced apart from the upper major side surface 74 of the second body portion 50 by the material thickness of the two layers 130 and 132. The lower major side surface 86 of the panel neck portion 46 is folded back on and overlies itself.

In the same way, the panel 42 (FIGS. 2B and 3B) is folded on its fold line 98 to form two layers 140 and 142 of fabric material which overlie each other and are in abutting engagement. In this folding step, the panel 42 is folded so that the body portion 96 pivots about the fold line 98 in a direction down into the paper as viewed in FIG. 2B then moves upward into a position underneath the body portion 94. The lower major side surface 102 of the first body portion 94 is in abutting engagement with the lower major side surface 116 of the second body portion 96. The upper major side surface 100 of the first body portion 94 is spaced apart from the upper major side surface 114 of the second body portion 96 by the material thickness of the two layers 140 and 142. The lower major side surface 126 of the lower panel neck portion 92 is folded back on and overlies itself.

As a result of the folding of the panels 40 and 42 along the fold lines 52 and 98, the panels are in a separated but folded condition, as illustrated in FIGS. 3A and 3B. The panel 40 is next placed on the panel 42 as shown in FIG. 4. With the panels 40 and 42 in the position of FIG. 4, the upper major side surface 74 of the upper panel second body portion 50 overlies the upper major side surface 100 of the lower panel first body portion 84. Only the panel 40 is visible in FIG. 4; the panel 42 is not visible in FIG. 4. The surfaces 74 and 100 are shown spaced apart in FIG. 5 for clarity.

Next, the panel 40 is stitched to the panel 42 with a double needle stitching line indicated schematically at 150. The stitching line 150 includes a series of stitches arranged in a straight line which extends from a first end 152 at the fold lines 52 and 98 and along the edges 80 and 120 of the neck portions 46 and 92. The series of stitches in the stitching line 150 then extends in a circular pattern close to the outer peripheral edges 56, 72, 99 and 112 of the air bag body portions 48, 50, 94 and 96. The series of stitches in the stitching line 150 then extends in a straight line along the outer edges 82 and 122 of the neck portions 46 and 92 and back to the fold lines 52 and 98. The stitching line 150 terminates at a second end 154 at the fold lines 52 and 98. The second end 154 is spaced apart from the first end 152 on the opposite side of the axis 44 so that at an opening 162 is defined between the folded neck portions 46 and 92. It should be understood that each of the panels 40 and 42 may, if desired, be sewn around its outer periphery prior to placing the panels together and sewing them together as shown in FIG. 4.

Next, the air bag 10 is turned inside out by pulling the right-hand portion of the air bag as viewed in FIG. 5, including the exposed panel edges 56, 72, 99 and 112, in a direction to the left as viewed in FIG. 5, through the opening 162 between the fold lines 52 and 98. The air bag 10 is then top stitched as shown in FIG. 6. Specifically, the panel layers 130, 132, 140 and 142 are sewn at 156 to each other (as viewed in FIG. 6) at a location spaced from the stitching line 150.

With the air bag 10 sewn in this manner, the neck portions 46 and 92 of the panels 40 and 42, each of which includes two layers of fabric material, form a mouth portion of the air bag 10 designated as 160 (FIGS. 5 and 7). The ends 152 and 154 of the stitching line 150, and the neck portions 46 and 92 of the panels 40 and 42, define the opening 162 (FIG. 5) into the air bag 10. The mouth portion 160 is tubular in configuration and surrounds the opening 162. The mouth portion 160 includes multiple layers of fabric material over its entire extent, as is described below in more detail.

The four body portions 48, 50, 94, and 96 of the panels 40 and 42 together form a body portion of the air bag 10 which is designated 170. The body portion 170 defines, inward of the circular portion of the stitching line 150, an inflation fluid volume 172 of the air bag 10. The inflation fluid volume 172 is in fluid communication with the opening 162. The body portion 170 includes multiple layers of fabric material over its entire extent, as is described below in more detail.

A retaining ring 174 (FIGS. 7–9) is next placed around the mouth portion 160 of the air bag 10. The retaining ring 174 (FIGS. 8 and 9) is a ring-shaped member preferably made from metal which is rectangular in configuration. The retaining ring 174 has a rectangular central opening through which the air bag mouth portion 160 extends.

The air bag mouth portion 160 is then folded back over the retaining ring 174 and sewn to itself to encircle the retaining ring. The step of sewing the air bag mouth portion 160 to itself includes sewing the neck portion 46 of the panel 40 to itself as indicated schematically at 176 in FIG. 7. Thus, the end portions of the panel layers 130 and 132, adjacent to the panel fold line 52, are sewn to other portions of the panel layers to secure the panel 40 to the retaining ring 174. In this manner, the two layers 130 and 132 of fabric material which form the panel 42 encircle the upper half of the retaining ring 174. The layers 130 and 132 of the panel 40 extend from the air bag body portion 170, along the inside of the retaining ring 174 (in a direction to the right as viewed in FIG. 7). The panel layers 130 and 132 wrap around the outer edge of the retaining ring 174 and extend along the outside of the retaining ring in a direction back toward the air bag body portion 170.

The step of sewing the air bag mouth portion 160 also includes sewing the neck portion 92 of the panel 42 to itself as indicated schematically at 178 in FIG. 7. The end portions of the panel layers 140 and 142, adjacent to the panel fold line 98, are sewn to other portions of the layers 140 and 142, in a manner so as to encircle the lower half of the retaining ring 174 as illustrated in FIG. 7. The two layers 140 and 142 of the air bag panel 42 extend from the air bag body portion 170 along the inside of the retaining ring 174 (toward the right as viewed in FIG. 7). The layers 140 and 142 wrap around the outer edge of the retaining ring 174 and extend along the outside of the retaining ring in a direction back toward the body portion 170.

The four layers of fabric material 130, 132, 140, and 142 define an inflation fluid opening 177 (FIG. 7) of the air bag 10. The inflation fluid opening 177 is in fluid communication with the inflation fluid volume 172.

The air bag 10 is next connected to the manifold 36 (FIGS. 8 and 9) by a pair of clamping strips 180. One of the clamping strips 180 is fixed to a top wall 182 of the manifold 36 by fasteners 184. The other clamping strip 180 is fixed to a bottom wall 186 of the manifold 36 by fasteners 188.

Figure 8:
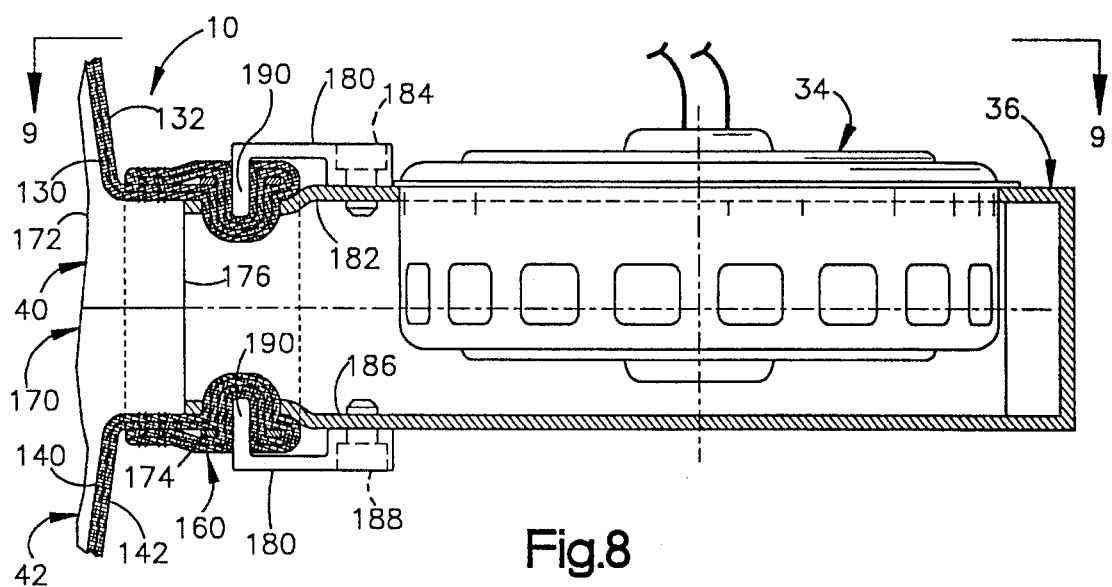
FIG. 8 is a schematic view partially in section illustrating the attachment of the inflatable restraint and retaining ring of FIG. 7 to an inflator and manifold.

Each of the clamping strips 180 has a plurality of clamping fingers 190. The clamping fingers 190 on each clamping strip 180 project toward, and are aligned with, the clamping fingers 190 on the other clamping strip 180. Each of the clamping fingers 190 extends through a respective one of a plurality of openings 192 in the retaining ring 174. The thickness of the fabric layers which form the mouth portion 160 of the air bag 10, and the size of the openings 192, are selected so that portions of the layers can be pressed inwardly through the openings 192 by the clamping fingers 190, as shown in FIG. 8. The clamping strips 180 thus cooperate with the retaining ring 174 to connect the mouth portion 160 of the air bag 10 to the manifold 36 and thereby to the inflator 34.

When the vehicle 12 (FIG. 1) experiences an impact which indicates the occurrence of a collision, such as a side impact to the vehicle door 16, the inflator 34 is actuated in a known manner. The inflator 34 directs inflation fluid under pressure into the manifold 36. The manifold 36 directs the inflation fluid through the inflation fluid opening 177 and through the mouth portion 160 of the air bag 10 and into the body portion 170. The air bag 10 inflates from a folded, stored condition as shown in dashed lines in FIG. 1 to an inflated condition as illustrated in dot-dash lines in FIG. 1.

The inflating air bag 10 moves a hinged portion 194 of the seat bottom cushion 22 in a direction away from the inflator 34, to enable deployment of the air bag. When the air bag 10 is in the inflated condition, as shown in dot-dash lines in FIG. 1, the air bag extends between the seat 18 and the door 16 to protect an occupant of the seat 18 from a forceful impact with the door 16.

During the period of time in which the air bag 10 is inflating, inflation fluid flowing into the inflation fluid volume 172 applies pressure to the body portion 170 of the air bag. This pressure can be relatively high in the case of a side impact air bag such as the air bag 10. The pressure of the inflation fluid is transmitted from the air bag body portion 170 through the mouth portion 160 and into the retaining ring 174. The multiple layers of fabric material in the body portion 170 of the air bag 10 help the air bag to withstand the pressure of the inflation fluid which is applied to the air bag. The multiple layers of fabric material of the air bag mouth portion 160, encircling the retaining ring 174, help the air bag to withstand the pressure of the inflation fluid which is transmitted through the mouth portion into the retaining ring as the air bag inflates.

FIGS. 10A–14 illustrate an air bag 210 in accordance with a second embodiment of the invention. The air bag 210 differs from the air bag 10 (FIGS. 1–9) in that the body portion of the air bag 210, for most of its extent, is formed from only a single layer of fabric material. Thus, the air bag 210 can be lighter than a corresponding air bag 10 and still retain the benefits of the multiple layered construction of the air bag mouth portion.

The air bag 210 (FIGS. 10A and 10B) is formed from two separate fabric material panels 240 and 242 which are folded and sewn together in a manner as illustrated in FIGS. 10–14. The panel 240, shown unfolded in FIG. 10A, is a single piece of fabric material which is symmetrical about a longitudinal central axis 244. A neck portion 246 of the panel 240 is disposed intermediate two body portions 248 and 250. A fold line 252 extends through the longitudinal center of the neck portion 246 in a direction perpendicular to the axis 244.

Figure 13:
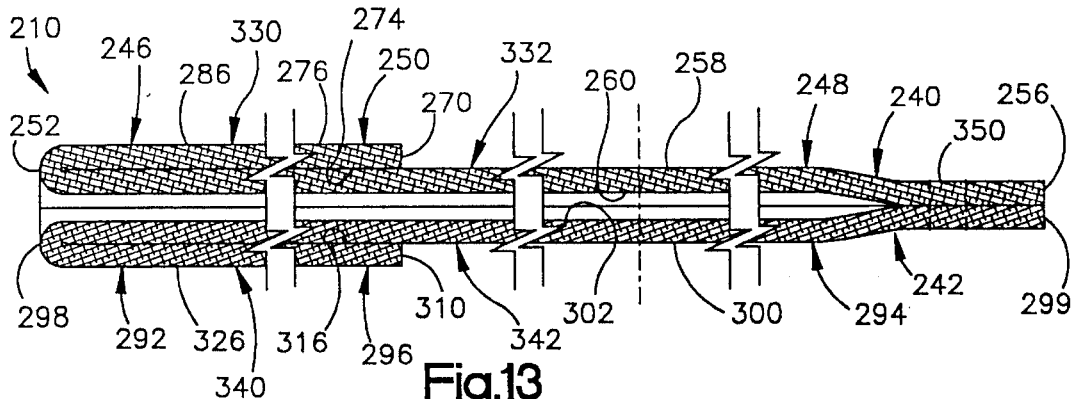
FIG. 13 is a sectional view taken along line 13—13 of FIG. 12.

The first body portion 248 of the panel 240 is identical in configuration to the first body portion 48 of the panel 40. The first body portion 248 is generally circular in configuration with a circular outer peripheral edge 256, an upper major side surface 258 and a lower major side surface 260 (FIG. 13).

The second body portion 250 of the panel 240 (FIG. 10A) has a straight edge 270 extending perpendicular to the axis 244, and is configured as a mirror image of an axially inner portion of the first body portion 248. The second body portion 250 is thus substantially smaller than the first body portion 248. The second body portion 250 has two spaced-apart arcuate outer edges 272, an upper major side surface 274, and a lower major side surface 276 (FIG. 13).

The neck portion 246 of the panel 240 (FIG. 10A) is identical to the neck portion 46 of the panel 40 of FIG. 2A. The neck portion 246 of the panel 240 has an upper major side surface 284 which extends between the upper major side surfaces 258 and 274 of the body portions 248 and 250. A lower major side surface 286 (FIG. 13) of the neck portion 246 extends between the lower major side surfaces 260 and 276 of the body portions 248 and 250.

Figures 10A, 11A:
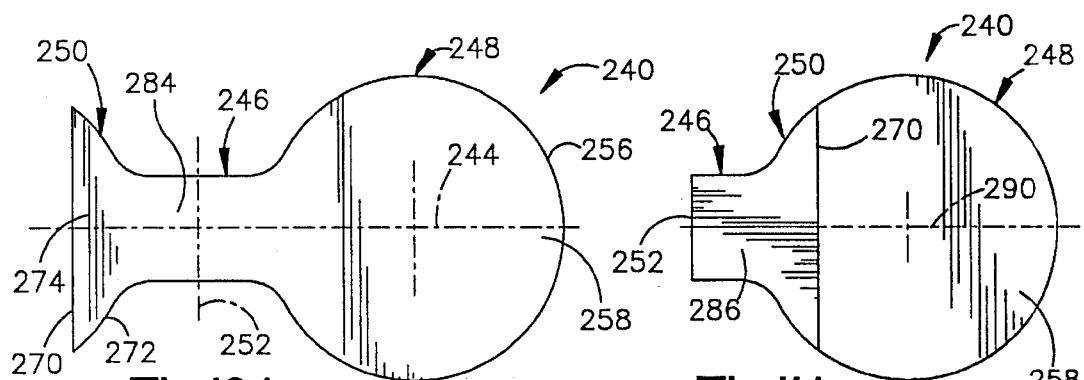
FIG. 10A is a view similar to FIG. 2A showing in an unfolded condition one of two fabric panels from which an inflatable restraint is made in accordance with a second embodiment of the invention.
FIG. 11A is a view showing the fabric panel of FIG. 10A folded.
Figures 10B, 11B:
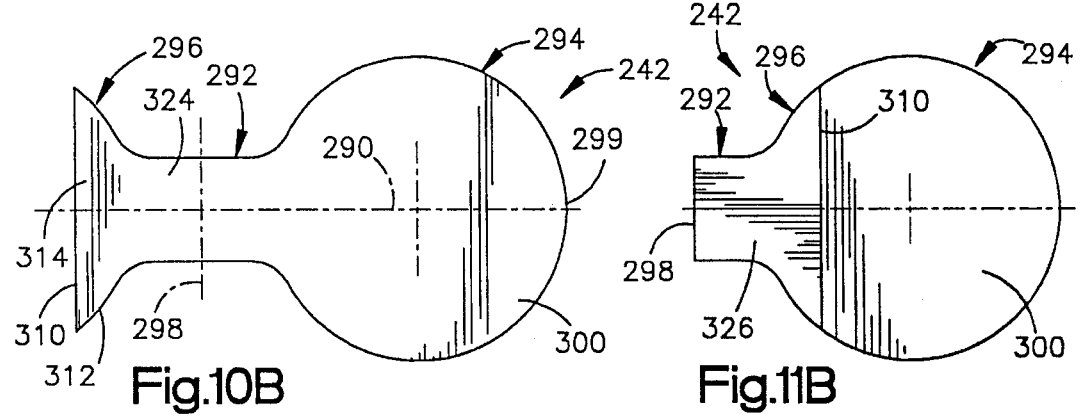
FIG. 10B is a view similar to FIG. 10A showing the other panel from which the inflatable restraint is made in accordance with the second embodiment of the invention.
FIG. 11B is a view similar to FIG. 11A showing the fabric panel of FIG. 10B folded.

The panel 242, shown unfolded in FIG. 10B, is identical in construction to the panel 240. The panel 242 is a single piece of fabric material which is symmetrical about a longitudinal central axis 290. A neck portion 292 of the panel 242 is disposed intermediate two body portions 294 and 296. A fold line 298 extends through the longitudinal center of the neck portion 292 in a direction perpendicular to the axis 290.

The first body portion 294 of the panel 242 is generally circular in configuration having a circular outer peripheral edge 299. The first body portion 294 has an upper major side surface 300 (FIG. 10B) and a lower major side surface 302 (FIG. 13).

The second body portion 296 of the panel 242 (FIG. 10A) is identical in configuration to the second body portion 250 of the panel 240. The second body portion 296 of the panel 242 has a straight outer edge 310, two spaced-apart arcuate outer edges 312, an upper major side surface 314 and a lower major side surface 316 (FIG. 13).

The neck portion 292 (FIG. 10A) of the panel 242 has an upper major side surface 324 which extends between the upper major side surfaces 300 and 314 of the body portions 294 and 296. A lower major side surface 326 (FIG. 13) of the neck portion 292 extends between the lower major side surfaces 302 and 316 of the body portions 294 and 296 of the panel 242.

The air bag 210 is assembled by first folding each of the panels 240 and 242 on its respective fold line from the condition shown in FIGS. 10A and 10B to the condition shown in FIGS. 11A and 11B. The folded condition of the separate panels 240 and 242 is also illustrated in FIG. 13 which shows the panels as folded and after having been sewn together in a manner as described below.

Specifically, the panel 240 (FIGS. 10A and 11A) is folded so that the second body portion 250 pivots about the fold line 252 in a direction upward out of the paper as seen in FIG. 10A, then moves downward into a position on top of the body portion 248. An axially inner part of the upper major side surface 258 of the first body portion 248 is in abutting engagement with the entire upper major side surface 274 of the second body portion 250. The upper major side surface 284 of the neck portion 246 of the panel 240 is folded back on and overlies itself. The folded panel 240 thus forms two layers 330 and 332 of fabric material which overlie each other and are in abutting engagement as best seen in FIG. 13.

In the same way, the panel 242 (FIGS. 10B and 11B) is folded on its fold line 298 to form two layers 340 and 342 of fabric material which overlie each other and are in abutting engagement. An axially inner part of the upper major side surface 300 of the first body portion 294 is in abutting engagement with the entire upper major side surface 314 of the second body portion 296. The upper major side surface 324 of the neck portion 292 of the panel 242 is folded back on and overlies itself.

As a result of folding of the panels 240 and 242 along the fold lines 252 and 298, the panels are in a separated but folded condition, as illustrated in FIGS. 11A and 11B. The folded panel 240 is next placed back-to-back on the folded panel 242, thus moving the separate panels to the positions shown in FIGS. 12 and 13. Only the panel 240 is visible in FIG. 12; the panel 242 is not visible in FIG. 12. In this condition, the lower major side surface 260 (FIG. 13) of the first body portion 248 of the panel 240 overlies the lower major side surface 302 of the first body portion 294 of the panel 242. The surfaces 260 and 302 are shown spaced apart in FIG. 13 for clarity. The smaller second body portions 250 and 296 of the panels 240 and 242 are on the outside of the air bag 210 when in this condition, as is seen more clearly in FIGS. 12 and 13.

Figures 12, 14:
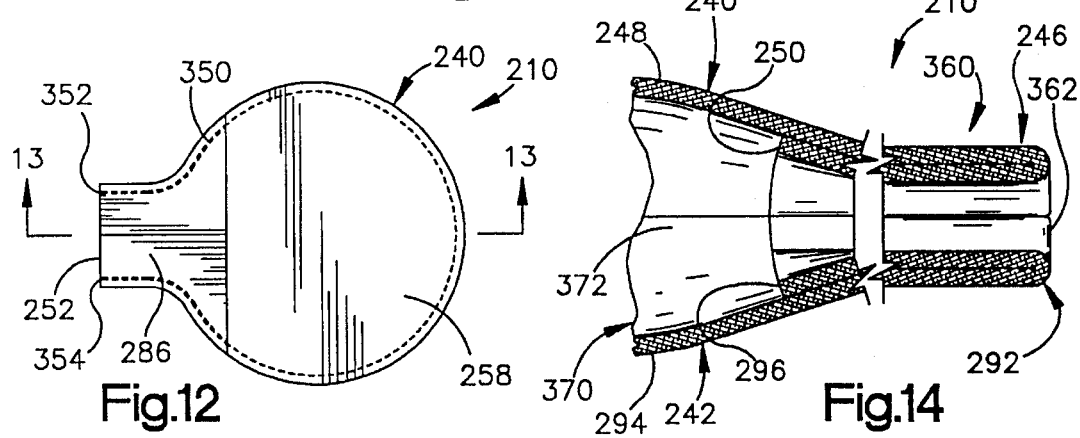
FIG. 12 is a view similar to FIG. 4 showing the fabric panels of FIGS. 11A and 11B in abutting engagement and sewn together.
FIG. 14 is a schematic partial sectional view of an inflatable restraint incorporating the folded fabric panels of FIGS. 11A and 11B.

Next, the panel 240 is stitched to the panel 242 by a stitching line indicated schematically at 350 in FIG. 12. The stitching line 350 terminates at ends 352 and 354 at the fold lines 252 and 298. The air bag 210 is then turned inside out by pulling the right-hand portion of the air bag, as viewed in FIG. 13, in a direction to the left, as viewed in FIG. 13, through the gap between the fold lines 252 and 298. The air bag 210 may then be top stitched (not shown) as in FIG. 6.

With the air bag 210 (FIG. 14) sewn in this manner, the neck portions 246 and 292 of the panels 240 and 242 form a tubular mouth portion of the air bag 210 designated as 360. The stitching ends 352 and 354, and the neck portions 246 and 292 of the panels 240 and 242, define an inflation fluid opening 362 of the air bag 210. The mouth portion 360 surrounds the inflation fluid opening 362 and includes over its entire extent at least two layers of fabric material.

The body portions 248, 250, 294, and 296 of the panels 240 and 242 form a body portion 370 of the air bag 210. The body portion 370 defines, inward of the circular portion of the stitching line 350, an inflation fluid volume 372 of the air bag 210. The inflation fluid volume 372 is in fluid communication with the inflation fluid opening 362. Because the second body portions 250 and 296 of the panels 240 and 242 are substantially smaller than the first body portions 248 and 294, the air bag body portion 370 is, for most of its extent, two single layers of fabric material which define between them the inflation fluid volume 372.

Figure 9:
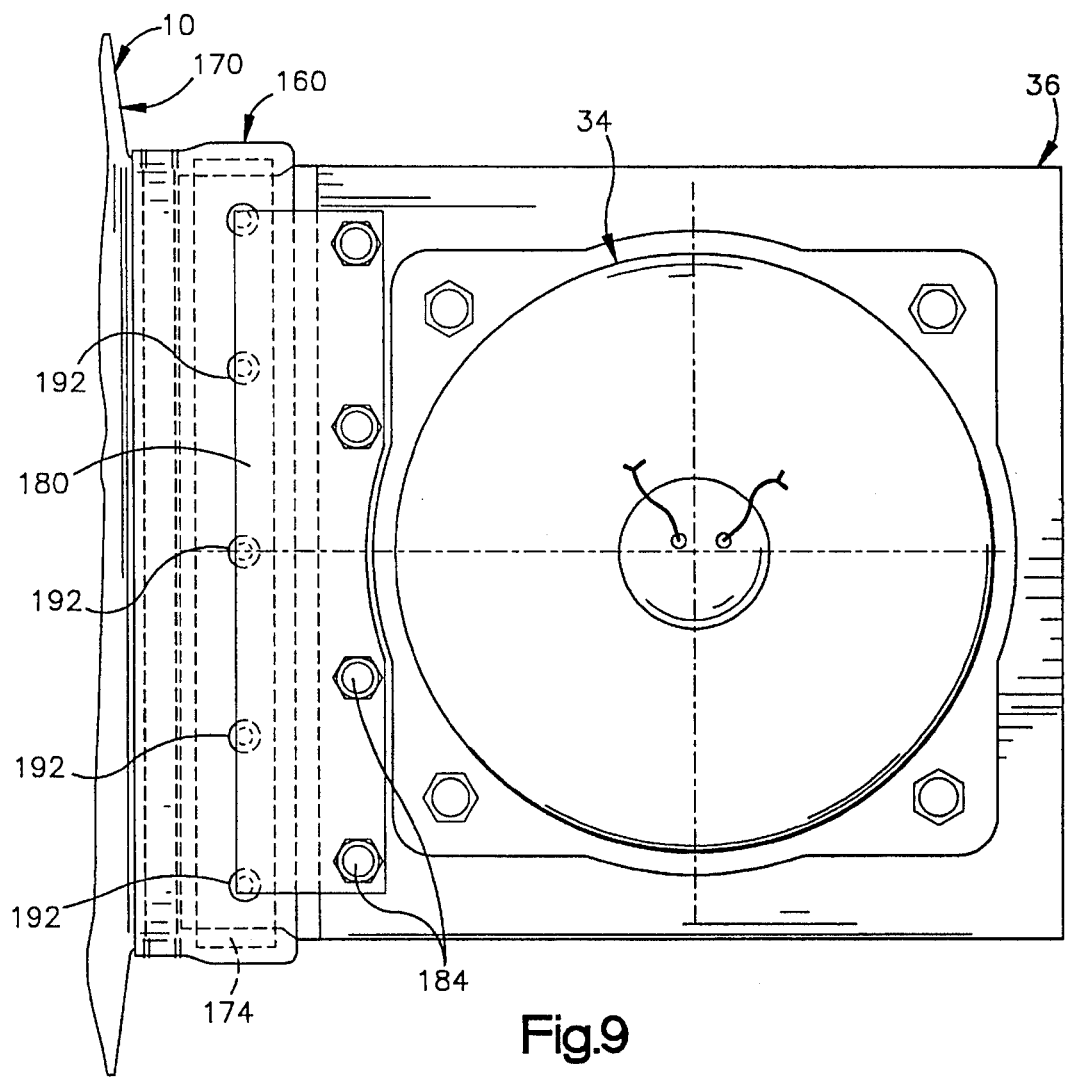
FIG. 9 is a view taken along line 9—9 of FIG. 8.

The air bag mouth portion 360 is then connected by sewing with a retaining ring (not shown) such as the retaining ring 174, in a manner as illustrated in FIG. 9. The air bag 210 and its retaining ring are next secured in an air bag module such as the module 30 (FIG. 1).

When the air bag 210 is inflated to restrain an occupant of a vehicle, inflation fluid under pressure is directed through the air bag mouth portion 360 and into the air bag body portion 370. The pressure of the inflation fluid is transmitted from the air bag body portion 370 through the air bag mouth portion 360, and into the retaining ring. The multiple layers of fabric material in the air bag mouth portion 360 help the air bag 210 to withstand the pressure of the inflation fluid which is transmitted through the mouth portion as the air bag inflates.

The body portions of the air bag 40, 42, 240 and 242 are illustrated and described herein as being generally circular in configuration. This provides the air bags 10 and 210 with a particular shape when inflated. If it is desired that another air bag constructed in accordance with the present invention have a different shape when inflated, then the body portions of the panels which form that other air bag could have a different shape.

From the above description of the invention, those skilled in the art will perceive improvements, changes and modifications in the invention. For example, instead of folding two panels to form four layers as in the air bag 10, four separate panels each half the size of one of the panels 40 and 42 could be used. Such improvements, changes and modifications within the skill of the art are intended to be covered by the appended claims.

Having described the invention, we claim:

1. An inflatable vehicle occupant restraint for use with an inflation fluid source, said inflatable vehicle occupant restraint comprising:

a body portion defining an inflation fluid volume into which inflation fluid is directed to inflate said body portion; and a mouth portion connected with said body portion, said mouth portion defining an inflation fluid opening in fluid communication with said inflation fluid volume and through which inflation fluid is directed into said inflation fluid volume to inflate said body portion;

said mouth portion including means for attaching said mouth portion to the inflation fluid source;

said mouth portion comprising at least two layers of fabric material overlying each other in abutting engagement and encircling said means for attaching said mouth portion to the inflation fluid source;

said inflatable restraint comprising a first panel of fabric material, said first panel having a first body portion, a second body portion, and a neck portion extending between and interconnecting said first and second body portions of said first panel;

said first panel being folded along a first fold line extending through said first panel neck portion with said first body portion overlying said second body portion;

said inflatable restraint comprising a second panel of fabric material, said second panel having a first body portion, a second body portion, and a neck portion extending between and interconnecting said first and second body portions of said second panel;

said second panel being folded along a second fold line extending through said neck portion of said second panel with said first body portion of said second panel overlying said second body portion of said second panel;

said folded first panel being disposed in overlying relationship with said folded second panel; and said inflatable restraint comprising stitching means for interconnecting said first and second panels in overlying relationship;

said at least two layers of fabric material of said mouth portion of said inflatable restraint comprising said folded neck portions of said first and second panels; and said body portion of said inflatable restraint comprising said body portions of said first and second panels.

2. An inflatable vehicle occupant restraint as set forth in claim 1 wherein said means for attaching said mouth portion to said inflation fluid source comprises a retaining ring, said retaining ring defining an opening coincident with said inflation fluid opening, said at least two layers of fabric material extending in a first direction through said opening in said retaining ring, wrapping around said retaining ring, and extending in a second direction opposite to said first direction to encircle said retaining ring.

3. An inflatable restraint as set forth in claim 1 including at least two layers of fabric material of said first panel in abutting engagement with each other for substantially their entire extent and at least two layers of fabric material of said second panel in abutting engagement with each other for substantially their entire extent.

4. An inflatable vehicle occupant restraint for use with an inflation fluid source, said inflatable vehicle occupant restraint comprising:

a body portion defining an inflation fluid volume into which inflation fluid is directed to inflate said body portion; and a mouth portion connected with said body portion, said mouth portion defining an inflation fluid opening in fluid communication with said inflation fluid volume and through which inflation fluid is directed into said inflation fluid volume to inflate said body portion;

said inflation fluid opening being defined in part by first and second opposite fabric material panels;

each of said first and second panels comprising at least two layers of fabric material in abutting engagement with each other;

wherein said at least two layers of fabric material of said first panel are in abutting engagement with each other for substantially their entire extent and said at least two layers of fabric material of said second panel are in abutting engagement with each other for substantially their entire extent; and wherein each of said first and second panels comprises a neck portion intermediate identical first and second body portions, each of said first and second panels being folded along a respective fold line extending through its respective neck portion, said first and second body portions of each of said first and second panels overlying each other and being in abutting engagement with each other for substantially the entire extent of said first and second body portions.

5. An inflatable restraint as set forth in claim 4 wherein said at least two layers of fabric material of said first panel comprise folded portions of said neck portion of said first panel which overlie each other in abutting engagement with each other, said at least two layers of fabric material of said second panel comprising folded portions of said neck portion of said second panel which overlie each other in abutting engagement with each other.

6. An inflatable restraint as set forth in claim 4 wherein said body portion of said inflatable restraint includes a first portion formed of one layer of fabric material of each of said first and second panels and a second portion formed of two layers of fabric material of each of said first and second panels.

* * * * *